(12) United States Patent
Cox et al.

(10) Patent No.: US 8,170,977 B2
(45) Date of Patent: May 1, 2012

(54) CONDITIONAL PROBABILITY TABLES FOR BAYESIAN BELIEF NETWORKS

(75) Inventors: Zachary T. Cox, Barrie (CA); Jonathan Pfautz, Jamaica Plain, MA (US); David Koelle, Arlington, MA (US); Geoffrey Catto, Somerville, MA (US); Joseph Campolongo, Watertown, MA (US)

(73) Assignee: Charles River Analytics, Inc., Cambridge, MA (US)

( * ) Notice: Subject to any disclaimer, the term of this patent is extended or adjusted under 35 U.S.C. 154(b) by 967 days.

(21) Appl. No.: 11/656,085

(22) Filed: Jan. 22, 2007

(65) Prior Publication Data

US 2008/0177679 A1    Jul. 24, 2008

(51) Int. Cl.
*G06F 9/44* (2006.01)
*G06N 7/02* (2006.01)
(52) U.S. Cl. ................. 706/52; 706/56; 706/45
(58) Field of Classification Search .................. None
See application file for complete search history.

(56) References Cited

OTHER PUBLICATIONS

Andersen et al., "HUGIN—a Shell for Building Bayesian Belief Universes for Expert Systems", 1989.*
Huang et al., "Automatic Symbolic Traffic Scene Analysis Using Belief Networks", 1994.*
Cooper, Gregory, "A Bayesian Method for the Induction of Probabilistic Networks from Data", 1992.*
Mahoney et al., "Constructing Situation Specific Belief Networks", 1998.*
Pfautz et al., "Complexities and Challenges in the Use of Bayesian Belief Networks: Informing the Design of Casual Influence Models," Proceeds of the Human Factors and Ergonomics Society 53rd Annual Meeting, pp. 237-241 (2009).

* cited by examiner

*Primary Examiner* — Jeffrey A Gaffin
*Assistant Examiner* — Adrian Kennedy
(74) *Attorney, Agent, or Firm* — McDermott Will & Emery LLP (57) ABSTRACT

An apparatus for making probabilistic inferences based on a belief network includes a processing system configured to receive as input one or more parameters of a causal influence model. The belief network has a child node Y and one or more parent nodes $X_i$ (i=1, . . . , n) for the child node Y. The causal influence model describes the influence of the parent nodes $X_i$ on possible states of the child node Y. The processing system is further configured to use a creation function to convert the parameters of the causal influence model into one or more entries of a conditional probability table. The conditional probability table provides a probability distribution for all the possible states of the child node Y, for each combination of possible states of the parent nodes $X_i$.

12 Claims, 10 Drawing Sheets

|  | $x_1$ | $x_2$ | $y^1$ | $y^2$ | $y^3$ |
|---|---|---|---|---|---|
| $X_1$ | $x_1^1$ | $x_2^1$ | $p_1^1$ | $p_1^2$ | $p_1^3$ |
| $X_2$ | $x_1^1$ | $x_2^2$ | $p_2^1$ | $p_2^2$ | $p_2^3$ |
| $X_3$ | $x_1^2$ | $x_2^1$ | $p_3^1$ | $p_3^2$ | $p_3^3$ |
| $X_4$ | $x_1^2$ | $x_2^2$ | $p_4^1$ | $p_4^2$ | $p_4^3$ |
| $X_5$ | $x_1^3$ | $x_2^1$ | $p_5^1$ | $p_5^2$ | $p_5^3$ |
| $X_6$ | $x_1^3$ | $x_2^2$ | $p_6^1$ | $p_6^2$ | $p_6^3$ |

FIG. 5A

|     | Y |     |     |
| --- | --- | --- | --- |
| $X_1$ | $y^1$ | $y^2$ | $y^3$ |
| $x_1^1$ | 0.6 | -0.3 | -0.3 |
| $x_1^2$ | -0.3 | 0.6 | -0.3 |
| $x_1^3$ | -0.3 | -0.3 | 0.6 |

|     | Y |     |     |
| --- | --- | --- | --- |
| $X_2$ | $y^1$ | $y^2$ | $y^3$ |
| $x_2^1$ | -0.4 | 0.2 | 0.2 |
| $x_2^2$ | -0.1 | -0.1 | 0.2 |

FIG. 5B

|  | Y | | |
|---|---|---|---|
| $X_1$ | $y^1$ | $y^2$ | $y^3$ |
| $x_1^1$ | 0.6 | -0.3 | -0.3 |
| $x_1^2$ | -0.3 | 0.6 | -0.3 |
| $x_1^3$ | -0.3 | -0.3 | 0.6 |

|  | Y | | |
|---|---|---|---|
| $X_2$ | $y^1$ | $y^2$ | $y^3$ |
| $x_2^1$ | -0.4 | 0.2 | 0.2 |
| $x_2^2$ | -0.1 | -0.1 | 0.2 |

FIG. 5C

|   | Y | | |
|---|---|---|---|
| $X_1$ | $y^1$ | $y^2$ | $y^3$ |
| $x_1^1$ | 0.6 | -0.3 | -0.3 |
| $x_1^2$ | -0.3 | 0.6 | -0.3 |
| $x_1^3$ | -0.3 | -0.3 | 0.6 |

|   | Y | | |
|---|---|---|---|
| $X_2$ | $y^1$ | $y^2$ | $y^3$ |
| $x_2^1$ | -0.4 | 0.2 | 0.2 |
| $x_2^2$ | -0.1 | -0.1 | 0.2 |

FIG. 5D

| | PARENTS | | CHILD | | |
|---|---|---|---|---|---|
| | $X_1$ | $X_2$ | Y | | |
| | | | y1 | y2 | y3 |
| 1 | X11 | X21 | 0.550 | 0.275 | 0.175 |
| 2 | X11 | X22 | 0.625 | 0.200 | 0.175 |
| 3 | X12 | X21 | 0.255 | 0.580 | 0.165 |
| 4 | X12 | X22 | 0.360 | 0.475 | 0.165 |
| 5 | X13 | X21 | 0.220 | 0.260 | 0.520 |
| 6 | X13 | X22 | 0.340 | 0.140 | 0.520 |

CONDITIONAL PROBABILITY TABLES FOR BAYESIAN BELIEF NETWORKS

FIELD OF THE DISCLOSURE

The present disclosure relates to Bayesian belief networks.

BACKGROUND

A Bayesian belief network includes nodes that are connected by directed edges or links. Each node represents a particular random variable having a certain number of states or values. Each link is directed from a parent node to a child node and shows the causal influence of the parent node on the child node. In particular, the link from a parent node to a child node represents a causal relationship between an event that occurred earlier, as indicated by the state of the parent node, and an event that occurred later, as indicated by the state of the child node.

Every child node in a belief network has an associated conditional probability distribution that describes the causal influence of its parents. The conditional probability distribution of a child node specifies one probability distribution for each combination of values of the parents of the child node. When all the nodes of a belief network are discrete, a conditional probability table (CPT) can represent the conditional probability distribution of each node. In a CPT, each row specifies the probability distribution of the child node, given a combination of states of the parent nodes. In addition to information stored in CPTs, which is based on prior knowledge, information regarding present or future events may be stored in the belief network in the form of evidence.

Using CPTs, and possibly evidence, beliefs can be computed for the nodes of the belief network. Beliefs represent conclusions that can be drawn about the present, using information about the past stored in the CPTs, and using information about the present stored in evidence, if any. A belief for a node X represents a conditional probability distribution of the node X, given all available evidence for that node.

To compute beliefs using a belief network, users of the belief network typically enter the CPT values for each node, based on the number of states of that node and on the number of parents that the node has. Such a process can become unwieldy, because the number of CPT values that must be specified for a node increases exponentially with the number of states and parents of the node.

There is a need for methods and systems that allow users of a belief network to generate CPTs more efficiently.

SUMMARY

An apparatus is described for creating a CPT using a simplified, more intuitive, and smaller set of parameters. The belief network has a child node Y and one or more parent nodes $X_i$ (i=1, ..., n) for the child node Y. The apparatus includes a processing system configured to receive as input one or more parameters of a causal influence model that describes the influence of the parent nodes $X_i$ on the possible states of the child node Y. The processing system is further configured to convert the parameters of the causal influence model into entries of a conditional probability table, using a creation function. The conditional probability table provides a probability distribution for all the possible states of the child node Y, for each combination of possible states of the parent nodes $X_i$.

DETAILED DESCRIPTION

Methods and systems are described that allow users of a belief network to compute beliefs without having to input all the CPT entries, whose number increases exponentially with the number of parents of the node. In this way, the speed of creating a belief network can be increased. A user interface is described that can provide visual and graphical presentation of a priori relationships among the nodes of the belief network, in near real time.

Figure 1:
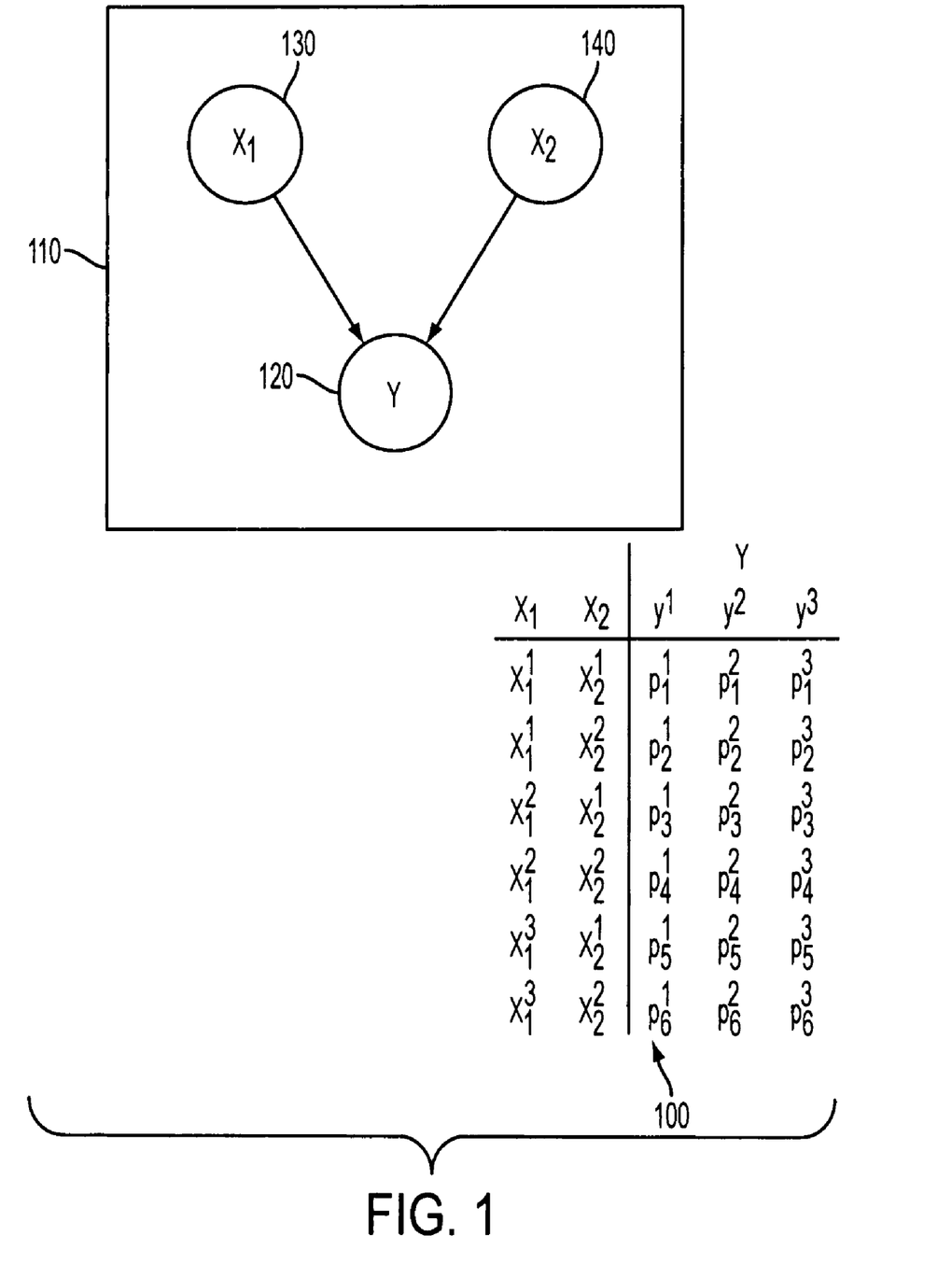
FIG. 1 illustrates one example of a CPT (Conditional Probability Table) for a BN (belief network) that includes one child Y having three states, a first parent $X_1$ having three states, and a second parent $X_2$ having two states.

FIG. 1 illustrates one example of a CPT (Conditional Probability Table) 100 for a simple exemplary belief network 110. The belief network 110 includes one child node Y, indicated with reference number 120, and two parent nodes $X_1$ and $X_2$, respectively indicated with reference numbers 130 and 140. In the illustrated example, the child node Y has three states, the first parent $X_1$ has three states, and the second parent $X_2$ has two states.

In general, a child node Y in a belief network has n parents $X_1, X_2, \ldots, X_n$, which may be denoted as $X=(X_1, X_2, \ldots, X_n)$ using a vectorial notation. The child Y has m states $y^1, y^2, \ldots, y^m$. Each one of the parents $X_i$ has $m_i$ states The CPT of a child node Y can be represented mathematically as $P(Y|X)$, and is made up of individual probabilities $P(y^k|x_l)$. Here, $y^k$ denotes the k-th state of child Y, and $x_l$ denotes the l-th configuration of the n parents X. The notation $x_i^j \sim x_l$ indicates that the parent $X_i$ takes on a state $x_i^j$ in $x_l$. $P(y^k|x_l)$ denotes the probability that the child Y be in the state $y^k$ given that Y's parents are in the configuration $x_l$. The probability $P(y^k|x_l)$ must be between 0 and 1: $P(y^k|x_l) \in [0,1]$. The sum over all possible m states of the probabilities $P(y^k|x_l)$ must be 1:

$$\sum_{k=1}^{m} P(y^k|x_l) = 1.$$

A summary of the variables and indices used to describe the CPT of the child node Y is provided below:
Y is the child node whose CPT is being generate;
$y^k$ is the k-th state of Y;
$X_i$ is the i-th parent of Y;
$x_i^j$ is the j-th state of parent $X_i$;

n is the number of parents of Y;
m is the number of states of Y;
$m_i$ is the number of states of $X_i$;
r is the number of rows in the child Y's CPT;
$p_l^k$ is the CPT entry in row l for child state k;
i is the parent index, $1 < i < n$;
j is the parent state index, $1 < j < m_i$;
k is the child state index, $1 < k < m$;
l is the CPT row index, $1 < l < r$.
The CPT contains a total of $$m \prod_{i=1}^{n} m_i$$

individual probabilities $P(y^k|x_l)$. In other words, the number of entries of the CPT increases exponentially with the number of parents. Generating a CPT thus requires a large number of parameters that may be time consuming for a human user to specify and for the processing system to handle.

In the present disclosure, methods and systems are provided that allow a user to specify a smaller number of intuitive parameters and then convert these parameters into a full CPT for desired child nodes.

Figure 2:
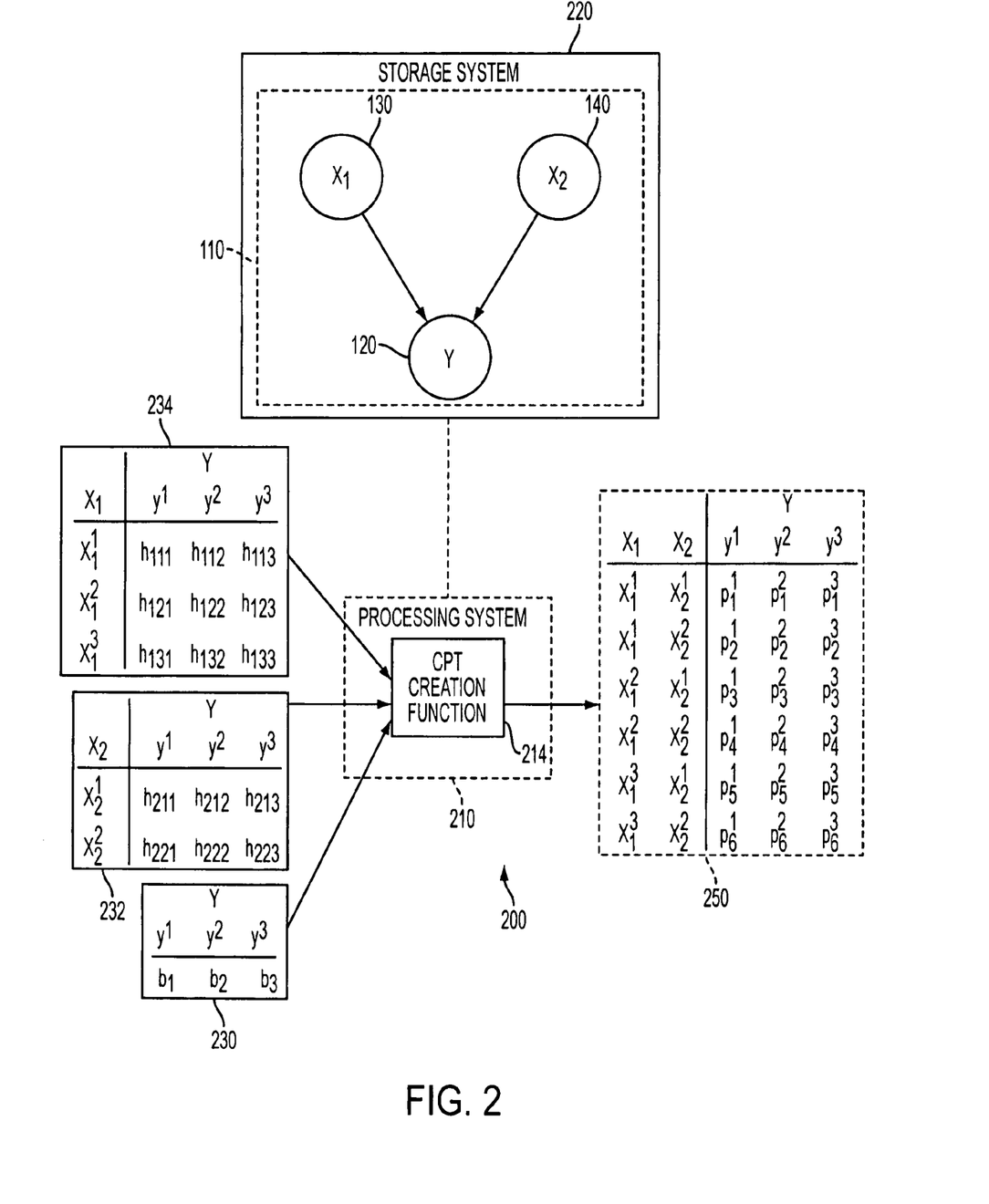
FIG. 2 is a functional diagram of an apparatus that creates a CPT from a smaller set of parameters using a CPT creation function as described in the present disclosure.

FIG. 2 is a functional diagram of an apparatus 200 that computes probabilities of interest, such as beliefs, for the belief network 110 shown in FIG. 1., using a CPT creation function. The apparatus 200 includes a processing system 210, and a storage system 220. The processing system 210 is configured to receive, as input, causal influence model (CIM) parameters that are denoted in FIG. 2 as 230, 232, and 234. A causal influence model is a model that describes the influence of the parent nodes of a child node on the possible states or values the child node may take. The CIM parameters 230, 232, and 234 are described in more detail below in conjunction with FIG. 3. The processing system 210 uses a CPT creation function 214 to convert these CIM parameters into entries of a CPT (conditional probability table) 250, and generates as output the CPT 250 for the child node Y.

The storage system 220 is a data storage medium, including but not limited to electromagnetic and optical data storage mediums, which stores data structures that include the belief network 110. As described in conjunction with FIG. 1, the belief network 110 includes one child node Y that has three states ($y^1$, $y^2$, and $y^3$), and two parent nodes $X_1$ and $X_2$, where $X_1$ has 3 states ($x_1^1$, $x_1^2$, $x_1^3$) and $X_2$ has two states ($x_2^1$, $x_2^2$).

Figure 3:
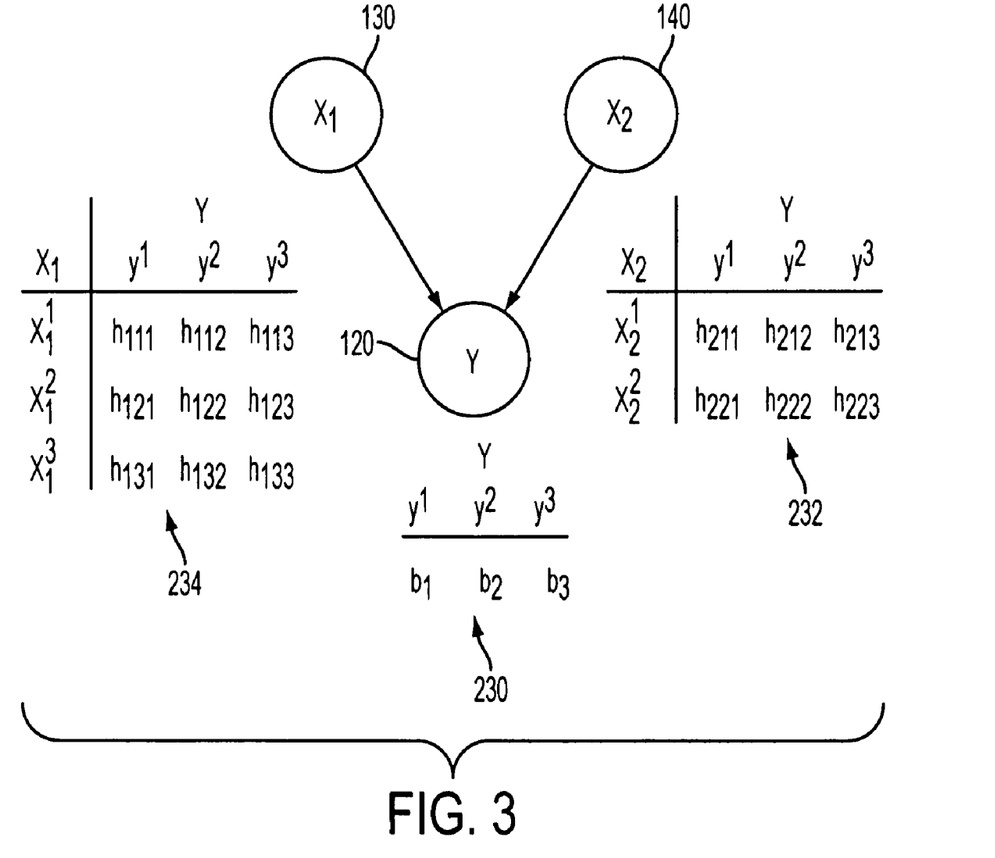
FIG. 3 illustrates CIM (Causal Influence Model) parameters for the BN illustrated in FIG. 1.

FIG. 3 illustrates in more detail the CIM parameters for the belief network illustrated in FIG. 1. In the illustrated embodiments, two types of CIM parameters are shown: 1) baseline probabilities $b_k$, and 2) causal influences $h_{ijk}$. A baseline probability $b_k$ represents the probability that the child node Y is in the state $y^k$, in the absence of any parent influence whatsoever. The probability $b_k$ must be less than or equal to 1, and greater than or equal to 0, i.e. $b_k \in [0,1]$. Also, the sum of $b_k$ over all possible states k of the child node Y must be 1:

$$\sum_{k=1}^{m} b_k = 1 \quad (1)$$

The baseline probabilities $b_k$ (k=1, . . . m) may thus be represented as a vector of size 1×m. In other words, the number of baseline probabilities is m, independent of the number of parents of the child node Y.

The causal influences $h_{ijk}$ describe the change in the probability that child Y is in state $y^k$, when the i-th parent $X_i$ is in the state $x_i^j$. The causal influences $h_{ijk}$ are greater than or equal to −1, and less than or equal to 1, since the most a causal influence $h_{ijk}$ can change a probability is to change a probability of 1 to 0, or change a probability of 0 to 1. In other words, $h_{ijk} \in [-1,1]$.

When $h_{ijk} > 0$, an increase occurs in the probability of $y^k$, because of the influence of the parents $X_i$. When $h_{ijk} < 0$, a decrease occurs in the probability of $y^k$, because of the influence of the parents $X_i$. When $h_{ijk} = 0$, no change occurs in the probability of $y^k$. The larger the magnitude of $h_{ijk}$, the larger the increase/decrease in the probability of $y^k$. Also, the sum of the causal influences $h_{ijk}$ over all possible states m of the child node Y is zero:

$$\sum_{k=1}^{m} h_{ijk} = 0 \quad (2)$$

The causal influences $h_{ijk}$ may be represented by n matrices of size $m_i \times m$, one for each parent $X_i$. The total number of causal influences is linear in the number of parents, and is given by $$m \sum_{i=1}^{n} m_i$$

causal influences.

In the present disclosure, the CPT creation function 214 uses an overall parent influence function $V_{lk}$, which describes an overall influence of all the parents on the probability of the child node Y being in a state $y^k$, when the parents are in a configuration $x_l$. The overall parent influence function $V_{lk}$ is a function of the causal influences $h_{ijk}$:

$$V_{lk} = f(h_{1jk}, h_{2jk}, \ldots, h_{njk})_{x_i^j = x_l} \quad (3)$$

The overall parent influence function $V_{lk}$ is between −1 and 1, $V_{lk} \in (-1,1)$. The sum of $V_{lk}$ over all possible states k= 1, . . . , m of the child Y is zero:

$$\sum_{k=1}^{m} V_{lk} = 0 \quad (4)$$

One simple example of the overall parent influence function $V_{lk}$ is given by a mean of all causal influences:

$$V_{lk} = \frac{1}{n} \sum_{\substack{i=1 \\ x_i^j = x_l}}^{n} h_{ijk} \quad (5)$$

An abstract form of a CPT creation function may be described conceptually as follows:

$$P(y^k|x_l) = \begin{cases} b_k + f(V_{lk}) & V_{lk} \geq 0 \\ b_k - f(V_{lk}) & V_{lk} < 0 \end{cases} \quad (6)$$

The above means that for a state $y^k$, if $V_{lk}$ is positive then the baseline $b^k$ is increased by some function of $V_{lk}$, whereas if $V_{lk}$ is negative then the baseline $b^k$ is decreased by some function of $V_{lk}$.

In one embodiment of the present disclosure, an actual CPT creation function may be given as follows:

$$P(y^k|x_l) = \begin{cases} b_k + sb^+(V_{lk}) & V_{lk} \geq 0 \\ b_k - sb^-(V_{lk}) & V_{lk} < 0 \end{cases} \quad (7)$$

In the equation above, $b^+$ denotes the maximum amount that the baseline probabilities can be increased, and is given by the following equation:

$$b^+ = 1 - \sum_{\substack{k=1 \\ V_{lk} \geq 0}}^{m} b_k \quad (8)$$

$b^-$ denotes the maximum amount that the baseline probabilities can be decreased, and is given by the following equation:

$$b^- = \sum_{\substack{k=1 \\ V_{lk} < 0}}^{m} b_k \quad (9)$$

$s_k$ denotes a scale factor, and is given by the following equation:

$$s_k = \begin{cases} 1 & V_{lk} \geq 0 \\ \frac{b_k}{|b^- V_{lk}|} & V_{lk} < 0 \end{cases} \quad (10)$$

The scale factor $s_k$ is used to keep each individual probability $P(y^k|x_l) \in [0,1]$.

The scale factor s is a scale factor to keep all the probabilities $P(y^k|x_l)$ less than or equal to one and greater than or equal to zero, and is given by:

$$s = \min_k(\min(s_k), 1) \quad (11)$$

Using the scale factor s ensures that all probabilities satisfy the following equation:

$$P(y^k|x_l) \in [0,1] \; 1 \leq k \leq m \quad (12)$$

Using the actual CPT creation function provided in equation (7) above, the following is guaranteed:

$$P(y^k|x_l) \in [0,1] \text{ and}$$

$$\sum_{k=1}^{m} P(y^k|x_l) = 1.$$

An exemplary algorithm for the CPT creation function is provided below. As a preliminary matter, the indices l and k for the rows of the CPT creation function and for each child state k satisfy the following relationships:

$1 \leq l \leq r$, for each row l in the CPT creation function; and
$1 \leq k \leq m$, for each child state k.

With the above constraints, the overall parent function $V_{lk}$ is calculated using equation (3). The baseline probabilities $b^+$ and $b^-$ be calculated, using equations (8) and (9). The scale factor s is calculated using equation (11).

The CPT entry for each row l and child state k can then be calculated, using equation (7).

Figure 4:
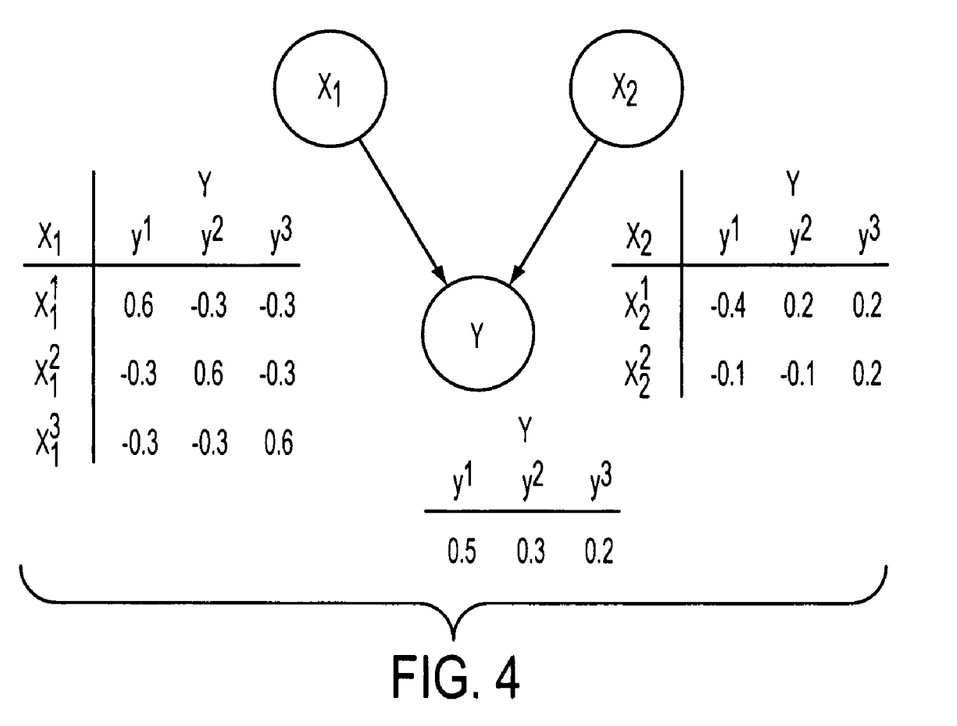
FIG. 4 illustrates exemplary CIM parameters for the BN illustrated in FIGS. 1 and 2.

FIG. 4 illustrates exemplary CIM parameters than have been calculated for the BN illustrated in FIGS. 1 and 2, using the algorithm described above. As seen from the CPT table for the parent $X_1$, the sum over all child states of the baseline probabilities is one $$\left(\sum_{k=1}^{m} b_k = 1\right),$$

as expected. Also as seen from the CPT table, the sum over all child states k of the causal influences $h_{ijk}$ is zero $$\left(\sum_{k=1}^{m} h_{ijk} = 0\right),$$

for each row of the CPT.

Figure 5A:
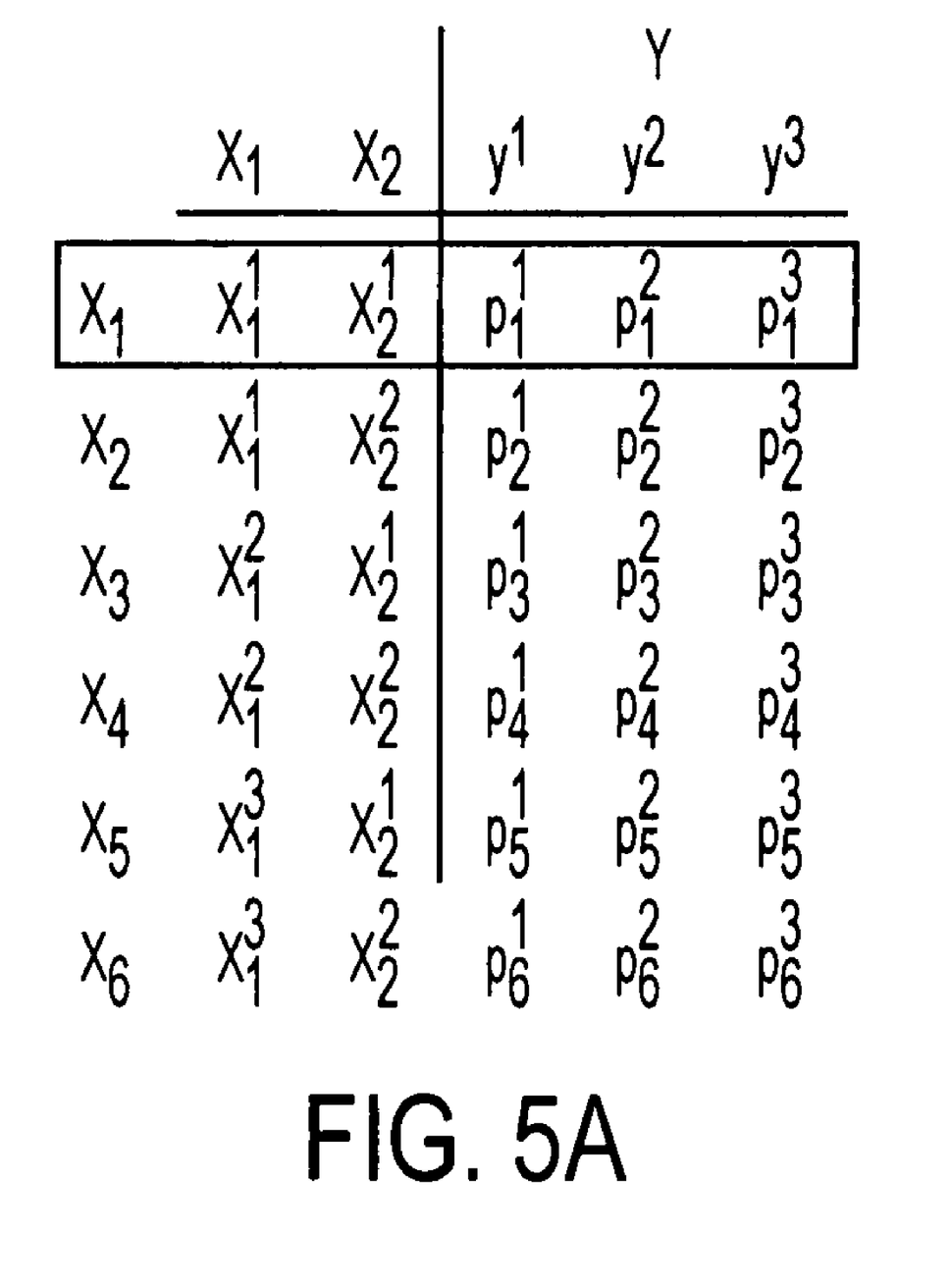
FIG. 5A illustrates the CPT shown in FIG. 4, with row/=1 illustrated.

FIG. 5A illustrates the CPT shown in FIG. 4, with row l=1 and child state k=1 illustrated. For row l=1, and child state k=1, $X_1$ takes on state j=1, and $X_2$ takes on state j=1.

Figure 5B:
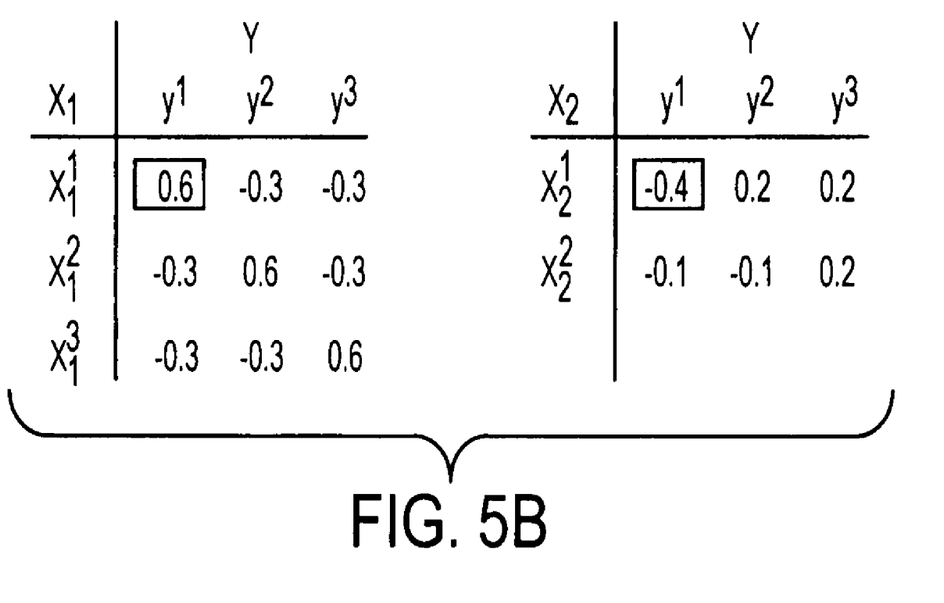
FIG. 5B illustrates the CPT shown in FIG. 4, with the CIM parameters $h_{111}$ and $h_{211}$ highlighted.

FIG. 5B illustrates the CPT shown in FIG. 4, with the CIM parameters h111 and $h_{211}$ highlighted, for row l=1 and child state k=1. Using the causal influence values $h_{111}$ and $h_{211}$ (l=1 and k=1), $V_{11}$ can be calculated as follows:

$$V_{11} = \frac{1}{2}(h_{111} + h_{211}) = \frac{1}{2}(0.6 - 0.4) = 0.1$$

Figure 5C:
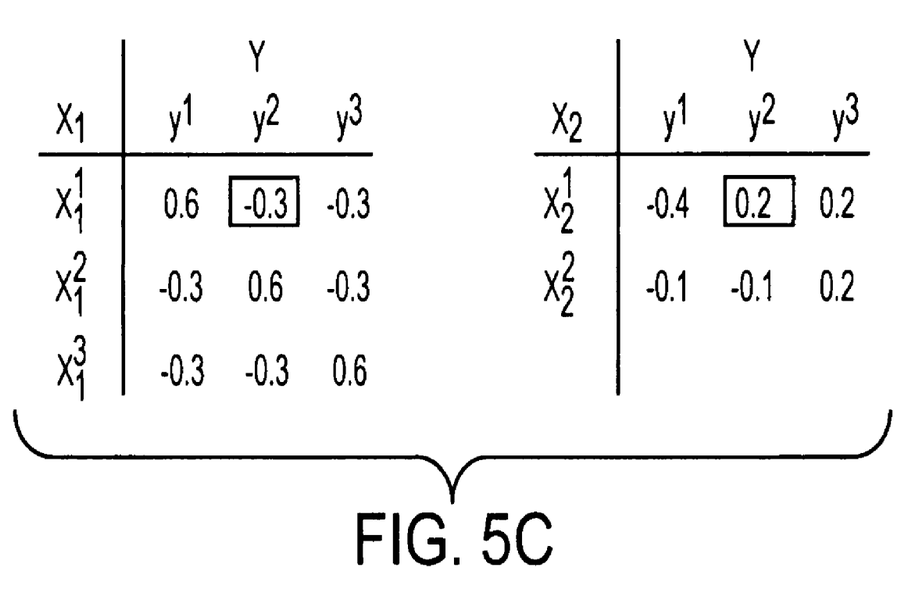
FIG. 5C illustrates the CPT shown in FIG. 4, with the CIM parameters $h_{112}$ and $h_{212}$ highlighted.

FIG. 5C illustrates the CPT shown in FIG. 4, with the CIM parameters $h_{111}$ and $h_{211}$ highlighted, for row l=1 and child state k=2. Using the causal influence values $h_{112}$ and $h_{212}$, $V_{12}$ can be calculated as follows:

$$V_{12} = \frac{1}{2}(h_{112} + h_{212}) = \frac{1}{2}(0.3 + -0.2) = -0.05$$

Figure 5D:
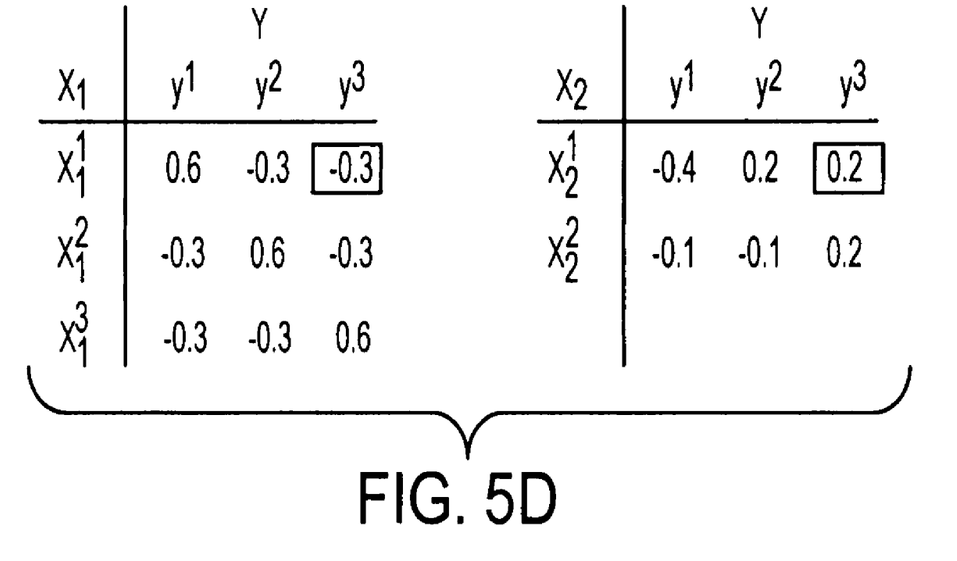
FIG. 5D illustrates the CPT shown in FIG. 4, with the CIM parameters $h_{113}$ and $h_{213}$ highlighted.

FIG. 5D illustrates the CPT shown in FIG. 4, with the CIM parameters $h_{113}$ and $h_{213}$ highlighted, for row l=1 and child state k=3. Using the causal influence values $h_{113}$ and $h_{213}$ (l=1 and k=3), $V_{13}$ can be calculated as follows:

$$V_{13} = \frac{1}{2}(h_{113} + h_{213}) = \frac{1}{2}(-0.3 + 0.2) = -0.05$$

Using equation (8), $b^+$ is given as follows:

$b+=1-(0.5)=0.5.$

Using equation (9), $b^-$ is given as follows:

$b-=0.3+0.2=0.5$

The scale factor s is calculated using equation (11), after first calculating $s_k$ from equation (10), where k=1, 2, and 3:

$s_1=1$ $s_2=b_2/|b-V_{12}|=0.2/|0.5-0.05|=12$ $s_3=b_2/|b-V_{13}|=0.2/|0.5-0.05|=8$ $s=\min(1,12,8)=1$ Finally, the CPT entries $p_1^1$, $p_1^2$, and $p_1^3$ can be calculated using equation (7), as follows:

$P(y^1|x_1)=p_1^1=b_1+sb^+V_{11}=0.5+1\cdot0.5\cdot0.1=0.55$

As seen above, the baseline is increased for $p_1^1$ from 0.5 to 0.55, because $V_{11} \geq 0$.

$P(y^2|x_1)=p_1^2=b_2+sb^-V_{12}=0.3+1\cdot0.5\cdot-0.05=0.275$

As seen above, the baseline is decreased for $p_1^2$ from 0.3 to 0.275, because $V_{12} \leq 0$.

$P(y^3|x_1)=p_1^3=b_3+sb^-V_{13}=0.2+1\cdot0.5\cdot-0.05=0.175$

As seen above, the baseline is decreased for $p_1^3$ from 0.2 to 0.175, because $V_{13} \leq 0$.

Figure 6:
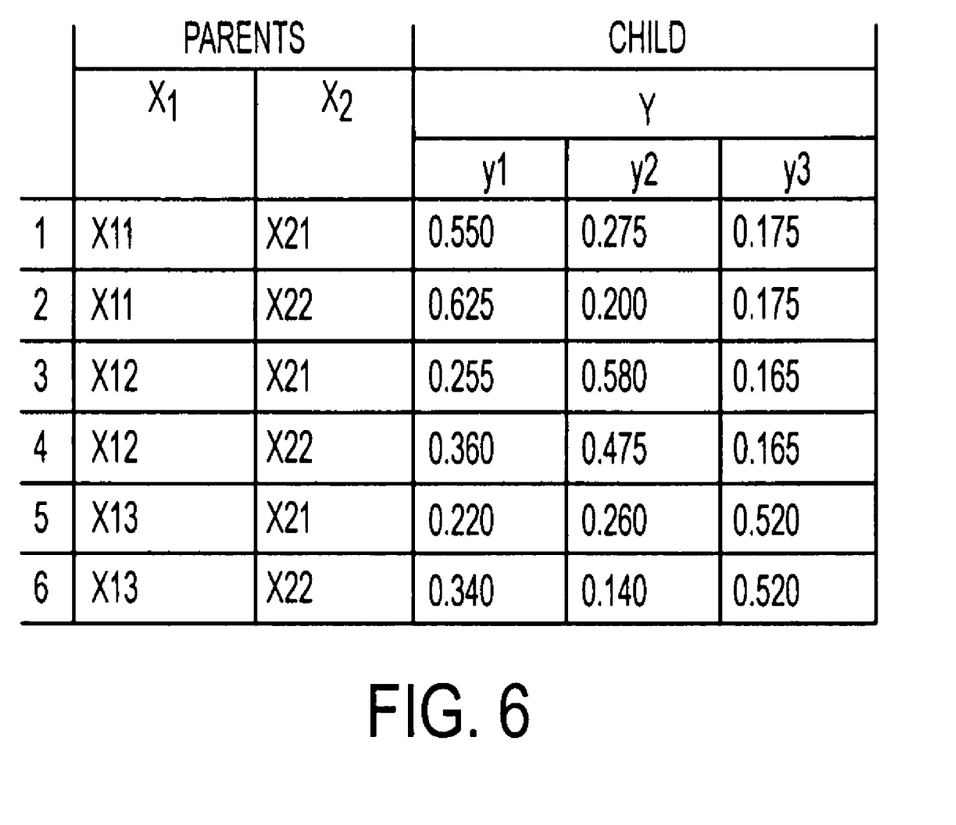
FIG. 6 illustrates a CPT created using the exemplary CIM parameters shown in FIG. 4.

Similar calculations are carried out for rows l=2, 3, 4, 5, and 6 to calculate the CPT entries show in FIG. 6.

FIG. 6 illustrates a CPT created using the exemplary CIM parameters shown in FIG. 4.

The CIM parameters may be input to the processing system using a number of methods. In one embodiment, the human user may specify the parameters. In another embodiment, the computer may learn the parameters from data. Once the CIM parameters have been input, the processing system 210 uses the CP creation function 214 (an example of which is provided by equation (7) above) to convert the inputted CIM parameters into a full CPT 250.

The CPT 250 can then be used to compute probabilities of interest (such as beliefs), using a belief network inference algorithm.

Figure 7:
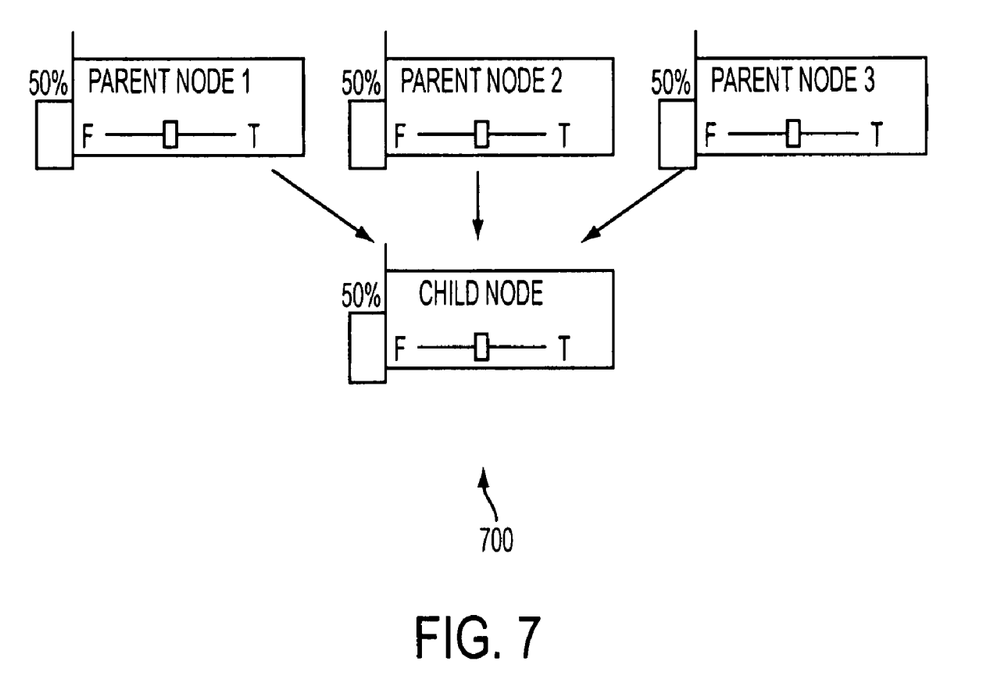
FIG. 7 illustrates a user interface that allows users to adjust relationships on the nodes and links within the belief network itself.

FIG. 7 illustrates a user interface 700 that allows users of a belief network to adjust relationships on the nodes and links within the belief network itself. While typical software for Bayesian belief networks requires a separate component for entering CPT values, the interface illustrated in FIG. 7 allows the user to adjust relationships on the nodes and links within the belief network itself.

In the illustrated embodiment, each node contains two states, true and false. Users indicate the strength of a relationship between nodes by adjusting a value on the link between them. This value is used as a parameter to the CIM algorithm to fill in the CPT for the child node.

Bayesian belief networks typically require end-users to enter an exponential number of CPT values for each node based on the number of states and parents that node has. The interface shown in FIG. 7 greatly reduces the number of CPT values that users must enter, by only requiring the user to input a linear number of relationships. For example, in FIG, the child node has three parents, so that $2^3$, or 8, values would normally have been required to be entered in the CPT. The use interface shown in FIG. 7 requires the user to indicate strengths on only 3 links. Relationships between parent nodes and child nodes can be various degrees (i.e., strengths) of either inhibiting or promoting.

The user interface 700 illustrated in FIG. 7 allows users to quickly and intuitively fill in a CPT for a belief network. User initiated operations may include, but are not limited to, the following:
  setting a link strength;
  choosing a link type (e.g., inhibiting or prohibiting);
  linking and/or unlinking nodes;
  setting and/or retracting evidence; and
  adding and/or removing nodes.

By allowing user operations as described above, the user interface 700 provides in substantial real time visual/graphical presentations of a priori relationships (inhibiting/promoting) among the nodes in the network.

In sum, methods and systems have been described for reducing the complexity of creating conditional probability tables for Bayesian belief networks. These methods and systems require fewer parameters than previously required for a full CPT, namely the number of parameters increase linearly with the number of parents, instead of exponentially. Also, the CIM parameters described in this disclosure are more intuitive, compared to a full CPT and other canonical models. More intuitive CPTs can therefore be generated. Visual/graphical presentation of a priori relationships among the nodes can be provided in near real time. The need for entry of CPT values by a user can be eliminated, since the user only needs to input CIM parameters. In this way, the complexity in creating a Bayesian belief network can be greatly decreased. Finally, the methods and systems described above allows users with little knowledge of belief networks to construct belief networks relatively easily and efficiently.

While certain embodiments have been described of a system and method for computing probabilities of variables in a belief network, it is to be understood that the concepts implicit in these embodiments may be used in other embodiments as well. For example, although an illustrative embodiment has been discussed for a belief network that includes one child node having three states, and two parent nodes having three states and two states respectively, it is to be understood that the methods and systems described above are applicable to belief networks having any number of child nodes and parent nodes, and any number of states for each of the child nodes and parent nodes. The protection of this application is limited solely to the claims that now follow.

In these claims, reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference, and are intended to be encompassed by the claims. Moreover, nothing disclosed herein is intended to be dedicated to the public, regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited in the phrase "step for."

What is claimed is:

1. An apparatus for making a probabilistic inference based on a belief network including a child node Y and one or more parent nodes $X_i$ (i=1, ..., n) for the child node Y, the apparatus comprising:
  a processing system configured to receive as input one or more parameters of a causal influence model that describes influence of the parent nodes $X_i$ on possible states of the child node Y, the processing system further configured to convert the parameters of the causal influence model into one or more entries of a conditional probability table, using a creation function;
  wherein the conditional probability table provides a probability distribution for all the possible states of the child node Y, for each combination of possible states of the parent nodes $X_i$;

wherein the parameters of the causal influence model comprise at least one of:

a baseline probability $b^k$ (k=1, ..., m) for each state $y^k$ (k=1, ... m) of the child node Y, wherein the baseline probability $b^k$ represents a probability that the child node Y is in the state $y^k$ when none of the parent nodes $X_i$ (i=1, ..., n) exert any influence on the child node Y;

a causal influence $h_{ijk}$ (i=1 ..., n; j=1 ... $m_i$; k=1 ... m), wherein the causal influence $h_{ijk}$ represents a change in the probability of the state $y^k$(k=1, ..., m) of the child node Y, when the i-th parent node $X_i$ (i=1, ..., n) is in a state $x_i^j$(j=1, ..., m); and wherein the creation function includes a parent influence function $V_{lk}$, and wherein the parent influence function $V_{lk}$ represents an overall influence of the parent nodes $X_i$ (i=1, ..., n) on a probability $P(y^k|x_l)$ that the child node Y is in the state $y^k$ given that the parent nodes are in the configuration $x_l$.

2. The apparatus of claim 1 further comprising a storage system connected to the processing system, wherein the storage system is configured to store a data structure that includes the belief network.

3. The apparatus of claim 1,
wherein the child node Y has a number m of states $y^k$ (k= 1, ..., m); and wherein each parent node $X_i$ (i=1, ..., n) has a number $m_i$ of states (j=1, ..., $m_i$).

4. The apparatus of claim 3,
wherein the n parent nodes $X_i$ (i=1, ..., n) has a number $l_{max}$ of possible configurations $$x_l(l = 1, \ldots, l_{max}), \text{ where } l_{max} = \prod_{i=1}^{n} m_i;$$

and
wherein $x_l$ represents the l-th configuration of the parent nodes $X_i$ (i=1, ..., n) in which each parent node $X_i$ (i= 1, ..., n) is in a state $x_i^j$ (j=1, ..., $m_i$).

5. The apparatus of claim 4, wherein the probability distribution for all possible states of the child node Y comprises a set of values $P(y^k|x_l)$, where $P(y^k|x_l)$ represents the probability that the child node Y is in the state $y^k$, given that the n parents of Y are in the configuration $x_l$.

6. The apparatus of claim 1, wherein the parent influence function $V_{lk}$ is a function of the causal influences $h_{ijk}$; and wherein $V_{lk}$ is represented mathematically by:

$$V_{lk}=f(h_{1jk}, h_{2jk}, \ldots, h_{njk}),$$

where parent node $X_i$ takes on a state $x_i^j$ in the configuration $x_l$,
where $$\sum_{k=1}^{m} V_{lk} = 0,$$

and
where the value of the parent influence function $V_{lk}$ is between −1 and 1.

7. The apparatus of claim 6, wherein the creation function that converts the parameters of the causal influence model is given by:

$$P(y^k|x_l) = \begin{cases} b_k + sb^+(V_{lk}) & V_{lk} \geq 0 \\ b_k - sb^-(V_{lk}) & V_{lk} < 0 \end{cases},$$

wherein $b^+$ represents the maximum amount that the baseline probabilities $b^k$ (k=1, ..., m) can be increased, and is represented mathematically by:

$$b^+ = 1 - \sum_{\substack{k=1 \\ V_{lk} \geq 0}}^{m} b_k;$$

wherein $b^-$ represents the maximum amount that the baseline probabilities $b^k$ (k=1, ..., m) can be increased, and is represented mathematically by:

$$b^- = \sum_{\substack{k=1 \\ V_{lk} < 0}}^{m} b_k;$$

and wherein s is a scale factor that keeps all probabilities $P(y^k|x_l)$ between 0 and one, and is represented mathematically by: s=min (min($s_k$), 1), $k$
where $$s_k = \begin{cases} 1 & \frac{b_k}{V_{lk}} & V_{lk} \geq 0 \\ \frac{b_k}{|b^- V_{lk}|} & V_{lk} < 0 \end{cases}.$$

8. The apparatus of claim 1, wherein the processing system is further configured to use an inference algorithm to make the probabilistic inference based on the entries of the conditional probability table.

9. The apparatus of claim 1, further comprising a user interface, wherein the user interface is configured to display the child node Y, the parent nodes $X_i$ and one or more links that indicate relationships between the child node Y and the parent nodes $X_i$; and wherein the user interface is configured to allow the users of the belief network to indicate a desired strength of relationships between the child node Y and the parent nodes $X_i$ by adjusting corresponding values on the links between the child node Y and the parent nodes $X_i$.

10. The user interface of claim 9, wherein the user-adjusted values on the links represent the parameters of the causal influence model that describes influence of the parent nodes $X_i$ on possible states of the child node Y; and wherein the user interface is further configured to provide the parameters of the causal influence model to a processing system that converts the parameters into entries of a conditional probability table.

11. A method of computing a belief in a belief network including a child node Y and one or more parent nodes $X_i$ (i=1, ..., n) for the child node Y, the method comprising:

receiving as input one or more parameters of a causal influence model that describes influence of the parent nodes $X_i$ on possible states of the child node Y; and with a processing system, converting the parameters of the causal influence model into one or more entries of a conditional probability table that provides a probability distribution for all the possible states of the child node Y, for each combination of possible states of the parent nodes $X_i$;

wherein the parameters of the causal influence model comprise at least one of:
- a baseline probability $b^k$ ($k=1, \ldots, m$) for each state $y^k$ ($k=1, \ldots, m$) of the child node Y, wherein the baseline probability $b^k$ represents a probability that the child node Y is in the state $y^k$ when none of the parent nodes $X_i$ ($i=1, \ldots, n$) exert influence on the child node Y;
- a causal influence $h(i=1 \ldots n; j=1 \ldots m_i; k=1 \ldots m)$, wherein the causal influence $h_{ijk}$ represents a change in the probability of the state $y^k$ ($k=1, \ldots, m$) of the child node Y, when the i-th parent node $X_i$ ($i=1, \ldots, n$) is in a state $x_i^j$ ($j=1, \ldots, m_i$);

wherein the act of converting the parameters of the causal influence model into the entries of the conditional probability table comprises using a creation function that includes a parent influence function $V_{lk}$; and wherein the parent influence function $V_{lk}$ is a function $V_{lk} = f(h_{1jk}, h_{2jk}, \ldots, h_{njk})$ of the causal influences $h_{ijk}$, and represents an overall influence of the parent nodes $X_i$ ($i=1, \ldots, n$) on a probability $P(y^k|x_l)$ that the child node Y is in the state $y^k$, given that the n parents of Y are in the configuration $x_l$, where each parent node $X_i$ takes on a state $x_i^j$ the configuration $x_l$.

12. A computer-readable non-transitory storage medium having stored therein computer-usable instructions for a processing system, wherein said instructions when executed by the processing system causes the processing system to:
receive as input one or more parameters of a causal influence model that describes influence of one or more parent nodes $X_i$ ($i=1, \ldots, n$) in a belief network on possible states of a child node Y in the belief network; and
convert the parameters of the causal influence model into one or more entries of a conditional probability table that provides a probability distribution for all the possible states of the child node Y, for each combination of possible states of the parent nodes $X_i$ ($i=1, \ldots, n$);

wherein the parameters of the causal influence model comprise at least one of:
a baseline probability $b^k$ ($k=1, \ldots, m$) for each state $y^k$ ($k=1, \ldots, m$) of the child node Y, wherein the baseline probability $b^k$ represents a probability that the child node Y is in the state $y^k$ when none of the parent nodes $X_i$ ($i=1, \ldots, n$) exert influence on the child node Y;
a causal influence $h_{ijk}$ ($i=1 \ldots n; j=1 \ldots m_i; k=1 \ldots m$), wherein the causal influence $h_{ijk}$ represents a change in the probability of the state $y^k$ ($k=1, \ldots, m$) of the child node Y, when the i-th parent node $X_i$ ($i=1, \ldots, n$) is in a state $x_i^j$ ($j=1, \ldots, m_i$);

wherein the act of converting the parameters of the causal influence model into the entries of the conditional probability table comprises using a creation function that includes a parent influence function $V_{lk}$ and wherein the parent influence function $V_{lk}$ is a function $V_{lk} = f(h_{1jk}, h_{2jk}, \ldots, h_{njk})$ of the causal influences $h_{ijk}$, and represents an overall influence of the parent nodes $X_i$ ($i=1, \ldots, n$) on a probability $P(y^k|x_l)$ that the child node Y is in the state $y^k$, given that the n parents of Y are in the configuration $x_l$, where each parent node $X_i$ takes on a state in the configuration $x_l$.

* * * * *